US 8,773,285 B2

(12) United States Patent
Yao et al.

(10) Patent No.: US 8,773,285 B2
(45) Date of Patent: Jul. 8, 2014

(54) PARKING PILOT METHOD AND DEVICE

(75) Inventors: Chi-Chun Yao, Changhua County (TW); Chun-Hsiung Chen, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 761 days.

(21) Appl. No.: 12/979,578

(22) Filed: Dec. 28, 2010

(65) Prior Publication Data

US 2012/0161983 A1    Jun. 28, 2012

(51) Int. Cl.
*B60Q 1/48*    (2006.01)
*G08G 1/14*    (2006.01)
*G08G 1/01*    (2006.01)
*G05D 1/00*    (2006.01)
*B60R 22/00*    (2006.01)

(52) U.S. Cl.
USPC ........ 340/932.2; 340/435; 340/903; 340/937; 340/436; 348/143; 348/162; 348/148; 701/1; 701/33.4; 701/532; 701/36

(58) Field of Classification Search
USPC .............. 340/932.2, 435, 436, 437, 903, 933; 701/1, 33.4, 36; 367/99
See application file for complete search history.

(56) References Cited

U.S. PATENT DOCUMENTS

| | | | |
|---|---|---|---|
| 7,257,486 B2 | 8/2007 | Shimazaki et al. | |
| 7,366,595 B1* | 4/2008 | Shimizu et al. | 701/301 |
| 8,154,426 B2* | 4/2012 | Endo et al. | 340/932.2 |
| 8,155,830 B2* | 4/2012 | Kuo et al. | 701/36 |
| 2002/0041239 A1* | 4/2002 | Shimizu et al. | 340/932.2 |
| 2005/0240323 A1* | 10/2005 | Orita | 701/28 |
| 2006/0069478 A1* | 3/2006 | Iwama | 701/36 |
| 2006/0202984 A1* | 9/2006 | Yang et al. | 345/419 |
| 2007/0100543 A1* | 5/2007 | Kato et al. | 701/208 |

FOREIGN PATENT DOCUMENTS

TW    I229645 B    3/2005

* cited by examiner

*Primary Examiner* — Fekadeselassie Girma
(74) *Attorney, Agent, or Firm* — Rosenberg, Klein & Lee

(57) ABSTRACT

A parking pilot method and a device thereof are disclosed. Image detectors capture surrounding images of a vehicle. A speed detector detects speed of the vehicle. A distance detector obtains distance between the vehicle and a barrier. A processor obtains relative coordinates of the vehicle and parking lot and the angle and width of the parking lot with the images, speed and distances. Thereby, the processor creates a preset parking pilot frame and works out a relative position of the preset parking pilot frame and the parking lot. Then, the processor designates the preset parking pilot frame and the parking lot on a display. According to the information on the display, the driver moves the vehicle to an initial position and makes the preset parking pilot frame coincide with the parking lot. Then, the processor instructs the driver to manually park the vehicle, or automatically parks the vehicle.

6 Claims, 7 Drawing Sheets

PARKING PILOT METHOD AND DEVICE

BACKGROUND OF THE INVENTION

1. Field of the Invention

The present invention relates to a parking pilot method and a device thereof, particularly to a parking pilot method and a device of, which can work out different preset parking pilot frames to assist drivers to park fast and accurately in different parking modes.

2. Description of the Related Art

The modern science and technology has matured the automobile industry. Functioning as the primary transport tool, automobiles are indispensable in modern living and have greatly promoted the living quality of people. The number of automobiles is fast growing in modern society. Thus, parking becomes a big challenge for drivers in a crowded metropolis. A driver usually has to drive around and around to find a parking bay in the same area. Sometimes, the driver has seen a parking bay, but he passes by and misses it with no chance to return to the parking bay. Sometimes, the driver finds none parking bay eventually. Sometimes, a novice driver has found a parking bay, but he may be inexperienced in operating the steering wheel, observing the obstacle, controlling the driving track and determining the parking location and thus has to move his car to and fro to see whether the parking bay can accommodate his car. However, a novice driver usually cannot park his car in such a case but has to abandon the ready parking bay and find another one. Those laborious and time-consuming parking activities repeat everywhere every day, which are likely to jam traffic or even cause traffic accidents.

In order to overcome the barrier of parking, some electronic devices have been developed to assist drivers to park easily and safely. For example, a Taiwan patent No. I229645 disclosed an auxiliary parking device, which comprises an image capture unit, a monitor arranged beside the driver seat, a deviation detection unit, a pilot unit, and a controller. The driver can operate his car to park in a target parking space according to the pilot information provided by the auxiliary parking device. However, the prior art cannot automatically measure a parking space but only uses an image detection unit to recognize the environment. Besides, the prior art only provides auxiliary vehicle-backing lines, and the driver still has to back his car manually.

From the above discussion, it is found that parking is a complicated driving behavior. In parking, the driver has to observe the surroundings sharp and evaluate it promptly and correctly to make an appropriate parking track. Therefore, how to enable drivers to park fast and accurately and shorten the time spent in parking is a problem the related field desires to solve.

Accordingly, the present invention proposes a parking pilot method and a device thereof to overcome the abovementioned problems.

SUMMARY OF THE INVENTION

The primary objective of the present invention is to provide a parking pilot method and a device thereof, which guide the driver to park from an optimized initial position, whereby the driver can park fast and accurately, and whereby the time spent in parking is effectively shortened.

Another objective of the present invention is to provide a parking pilot method and a device thereof, which can accurately evaluate whether a parking space is large enough to accommodate a car, and which can provide optimized pilot paths for different parking modes, such as on-street parking, backing a car into a garage, and slanted parking.

To achieve the abovementioned objectives, the present invention proposes a parking pilot method, which comprises steps: capturing images of surroundings of a vehicle, detecting a speed of the vehicle, and detecting a distance from the vehicle to a barrier, to obtain at least one parking lot, an angle and a width of the parking lot; evaluating whether the parking lot is suitable for the vehicle; if the parking lot is suitable for the vehicle, obtaining relative coordinates of the parking lot and the current position of the vehicle according to the images of surroundings of the vehicle, the speed of the vehicle and the detected distances, and using the relative coordinates to create a preset parking pilot frame and work out a relative position of said preset parking pilot frame and said parking lot; designating the preset parking pilot frame on the display, and guiding the vehicle to an optimized initial position so as to make the preset parking pilot frame coincide with the parking lot; and parking the vehicle into the parking lot. When the vehicle is at an optimized initial position, a processor outputs operation instructions to guide the driver to manually park the vehicle into the parking lot, or automatically controls a steering wheel of the vehicle to park the vehicle into the parking lot. Via the present invention, a driver can fast and accurately park his vehicle into a parking lot, not worrying about poor driving skill, narrow parking space or barriers.

The present invention also proposes a parking pilot device, which is installed in a vehicle and comprises a display installed inside the vehicle to provide information for a driver; at least one image detector installed on the vehicle to capture images of surroundings of the vehicle; a speed detector detecting a speed of the vehicle; at least one distance detector detecting a distance between the vehicle and at least one parking lot and detecting a distance between the vehicle and a barrier; a processor connected with the display, the image detector, the speed detector and the distance detector, obtaining relative coordinates of a current position of the vehicle and the parking lot and an angle and a width of the parking lot to work out a preset parking pilot frame, guiding the driver to move the vehicle to an initial position and make the preset parking pilot frame coincide with the parking lot, and outputting operation instructions to guide the driver to manually park the vehicle into the parking lot, or automatically controlling a steering wheel of the vehicle to park the vehicle into the parking lot.

Below, the embodiments are described in detail to make easily understood the objectives, technical contents, characteristics and accomplishments of the present invention.

DETAILED DESCRIPTION OF THE INVENTION

Figure 1:
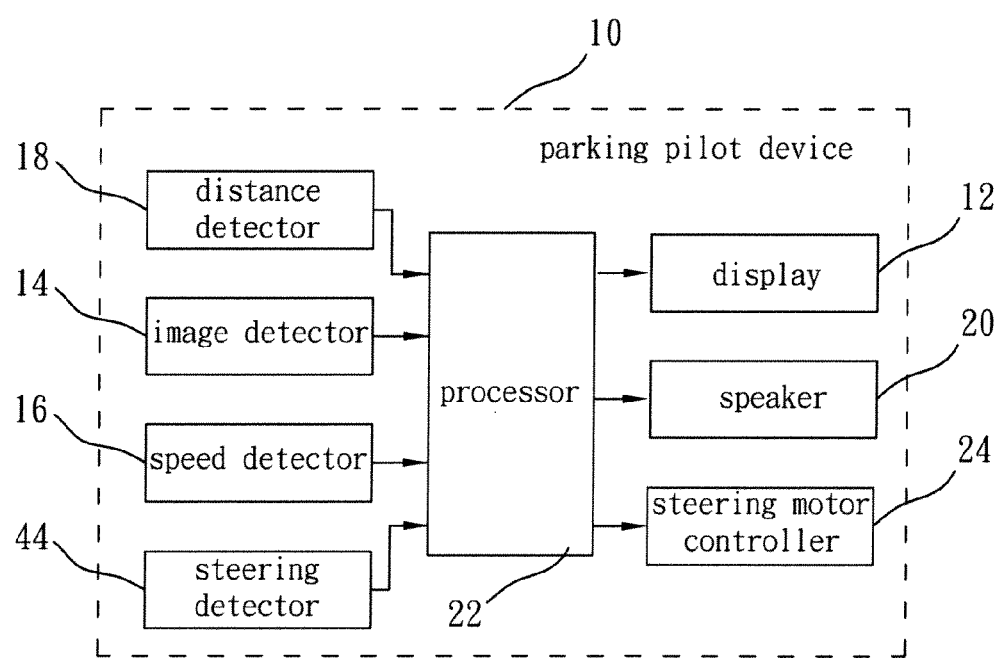
FIG. 1 is a block diagram schematically showing the architecture of a parking pilot device according to one embodiment of the present invention.
Figure 2:
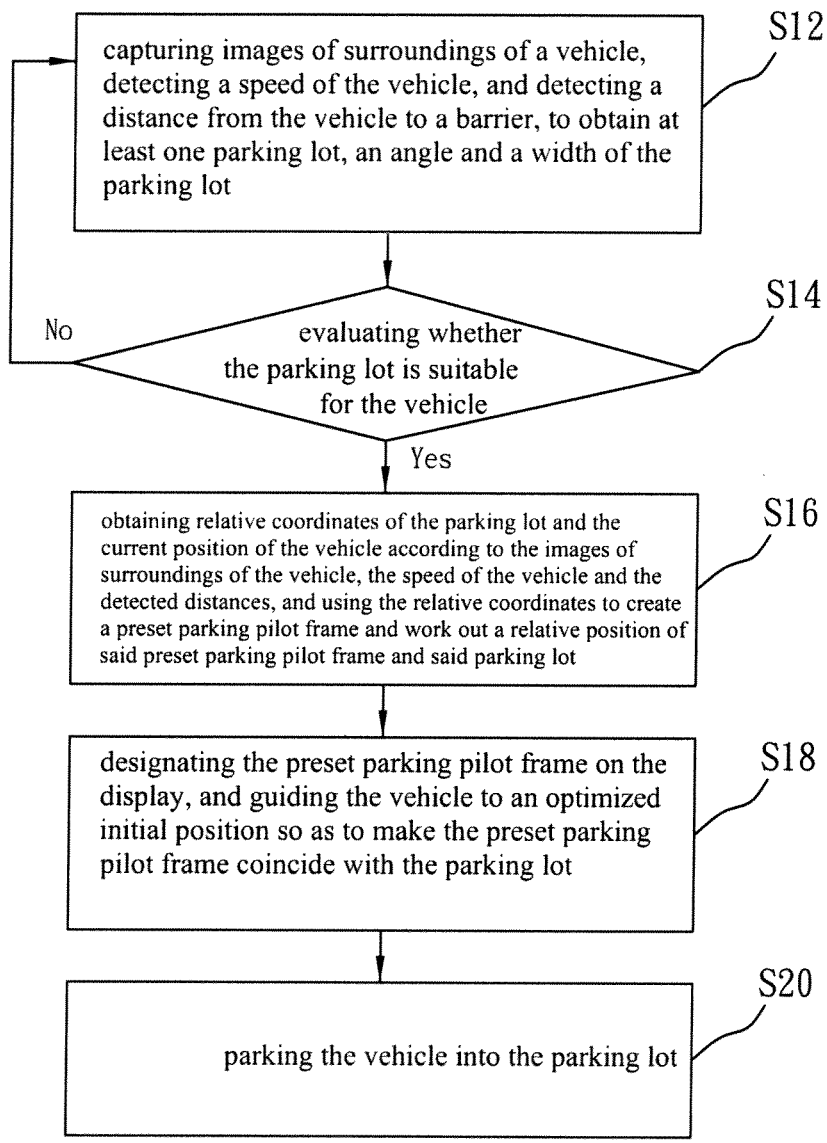
FIG. 2 shows a flowchart of a parking pilot method according to one embodiment of the present invention.

The present invention proposes a fast and accurate parking pilot mechanism. Refer to FIG. 1 and FIG. 2. FIG. 1 is a block diagram schematically showing the architecture of a parking pilot device according to one embodiment of the present invention. FIG. 2 shows a flowchart of a parking pilot method according to one embodiment of the present invention. The parking pilot device 10 of the present invention is installed in a vehicle and started when a driver intends to find an appropriate parking lot. The parking pilot device 10 comprises a display 12, at least one image detector 14, a speed detector 16, at least one distance detector 18, a speaker 20, a processor 22 and a steering motor controller 24. The processor 22 is connected with the display 12, the image detector 14, the speed detector 15, the distance detector 18, the speaker 20 and the steering motor controller 24. The parking pilot device 10 is preferred to have a plurality of image detectors 14 (such as common cameras or surveillance cameras) and distance detectors 18, which are respectively arranged in the head, tail and body of the vehicle to provide driving information for the driver. The display 12 is a touch-control liquid crystal display and arranged beside the driver seat, and the driver receives driving information from the display 12. The steering motor controller 24 is installed on the steering wheel to control the steering wheel.

In Step S12, the image detector 14 captures the front-view images, the rear-view images and the side-view images; the speed detector 16, such as a wheel speed detector or an acceleration detector, detects the speed of the running vehicle; the distance detector 18, such as an ultrasonic distance detector, obtains the distance between the vehicle and a parking lot and the distance between the vehicle and a barrier, via such as the echo of ultrasonic signals. Next, a parking lot positioning algorithm is used to calculate the angle and width of a parking lot according to one of the following equations:

$$c_{x1} = (d \cdot \text{count1} + H_m \cdot \tan\theta_1) \cdot \cos\theta_1 \geq W + 2t \quad (1)$$

$$c_{x2} = (d \cdot \text{count2} - H_o \cdot \tan\theta_1) \cdot \cos\theta_1 \geq W + 2t \quad (2)$$

$$c_{x3} = (d \cdot \text{count2} - H_o \cdot \tan\theta_1 + H_p \cdot \tan\theta_2) \cdot \left(\frac{\sin(90 - \theta_2)}{\cos(\theta_2 - \theta_1)} + \tan(\theta_2 - \theta_1)\right) - \frac{H_p \cdot \sin(\theta_2 - \theta_1)}{\cos\theta_2} \ldots (\theta_1 < \theta_2) \quad (3)$$

$$c_{x3} = (d \cdot \text{count2} - H_o \cdot \tan\theta_1 + (H_p - H_q)\tan\theta_2 + H_q \cdot \tan\theta_1) \cdot \cos\theta_1 \ldots (\theta_1 > \theta_2) \quad (4)$$

wherein $C_{x1}$, $C_{x2}$, $C_{x3}$ denote the minimum widths required by the user's vehicle, d the gear width of the speed detector 16, count1, count2 the gear numbers that the speed detector 16 detects while the vehicle is running, $H_m$, $H_o$, $H_p$, $H_q$ the vehicle-to-parking lot distances that the distance detectors 18 detect, $\theta_1$, $\theta_2$ the angles of vehicles having been parked on other parking lots, W the width of the user's vehicle, and t the width tolerance for parking.

Figure 3:
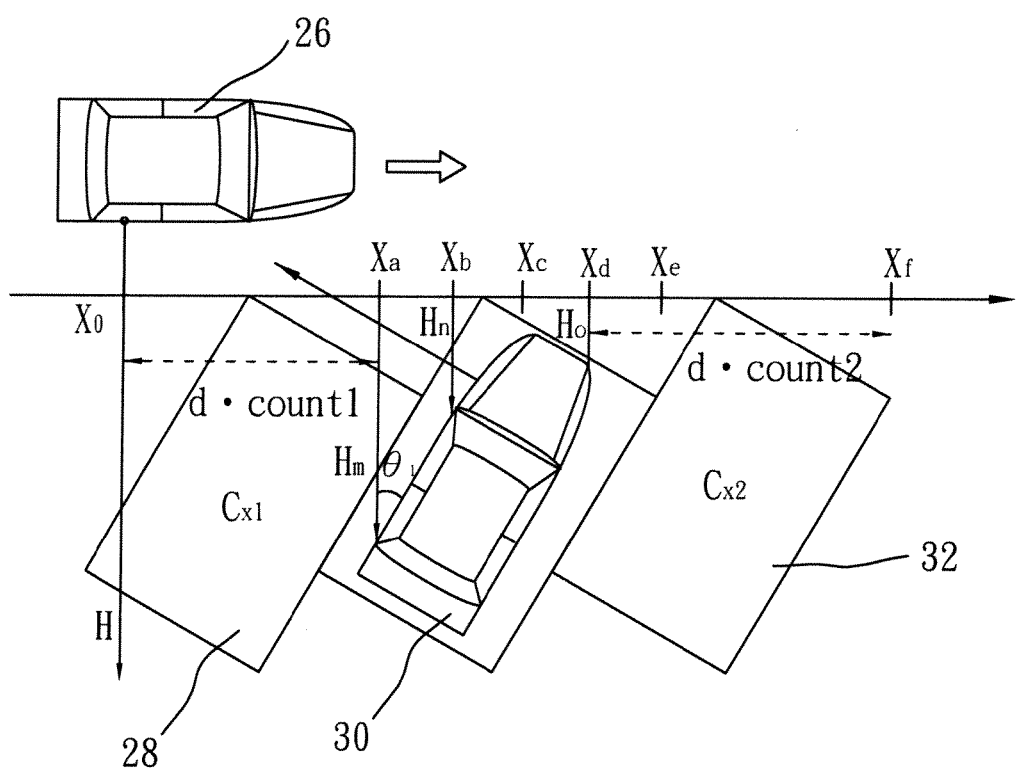
FIG. 3 is a diagram schematically showing detection of a parking lot according to one embodiment of the present invention.
Figure 4:
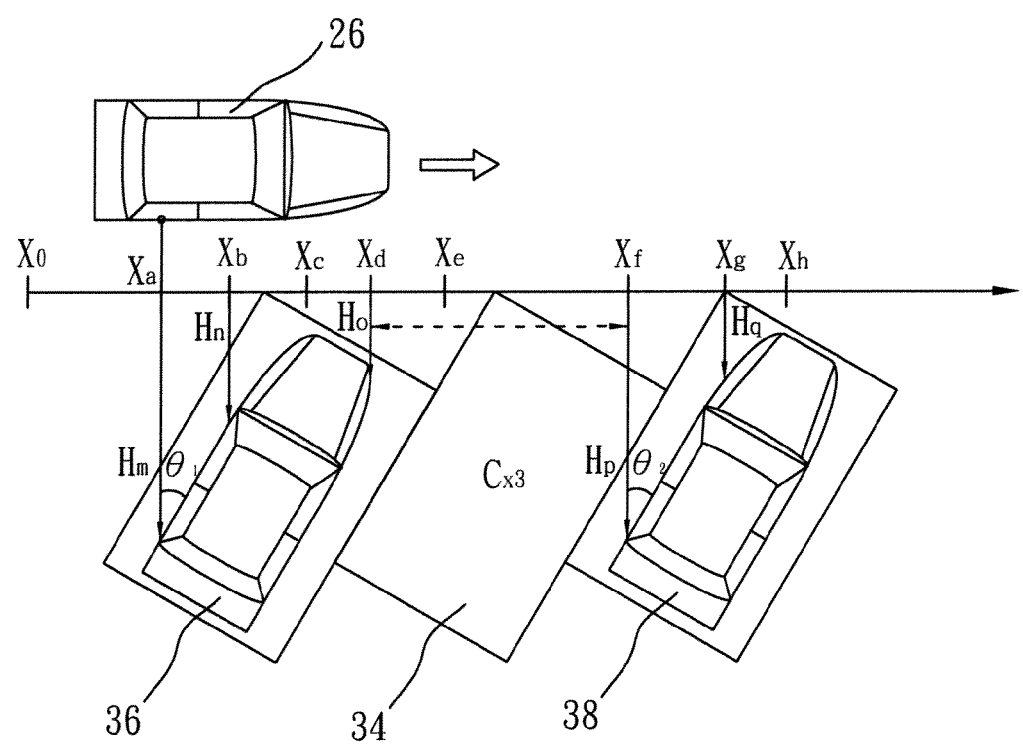
FIG. 4 is a diagram schematically showing detection of another parking lot according to one embodiment of the present invention.

Refer to FIG. 3 and FIG. 4 for a first embodiment and a second embodiment of detecting parking space according to the present invention. There are various types of parking lots, including side-by-side parking lots, head-to-tail parking lots, and slanted parking lots. No matter what type of a parking lot, the parking lot positioning algorithm of the present invention can always work out the angle and width thereof. Herein, slanted parking lots are used for exemplification. Suppose that the image detector 14 has captured the image of a parking lot and that the user's vehicle 26 has arrived at a first parking lot 28. The parking pilot device 10 starts to obtain the distance between the user's vehicle 26 and the first parking lot 28 and the distance between the user's vehicle 26 and a barrier. The barrier is successive parking lots in this embodiment, and a vehicle 30 has parked on one of the parking lots. As shown in FIG. 3, the detected parking lot 28 is at the left of the parked vehicle 30. The ultrasonic distance detector uses the echo of ultrasonic signals to obtain a vertical distance parameter $H_m$ between the user's vehicle 26 and the parked vehicle 30. Thus is worked out the angle $\theta_1$ of the parked vehicle 30 on the slanted parking lot. The processor 22 calculates a horizontal distance parameter by which the user's vehicle 26 runs through the first parking lot 28 via multiplying d (the gear width of the speed detector 16) and count1 (the gear number detected by the speed detector 16 while the vehicle 26 runs through the first parking lot 28). The horizontal distance parameter d·count1 and the vertical distance parameter $H_m$ are used to work out the angle and width $C_{x1}$ of the first parking lot 28 according to Equation (1).

Next, the process proceeds to Step S14. In Step S14, the processor 22 determines whether the difference between the widths of the first parking lot 28 and the user's vehicle 26 is greater than the required width tolerance according to the angle and width $C_{x1}$ of the first parking lot 28. In other words, the processor 22 evaluates whether the detected parking space is sufficient.

If the parking space is insufficient, the processor 22 controls the speaker 22 to output a prompt to the user, and the process returns to Step S12 to find another suitable parking lot. Thus, the user's vehicle 26 keeps running forward, and the parking pilot device 10 detects a second parking lot 32 at the right of the parked vehicle 30. The processor 22 uses the ultrasonic distance detector to receive the ultrasonic signals echoed from the parked vehicle 30 to obtain a vertical distance parameter $H_o$ between the user's vehicle 26 and the vehicle 30 that has been parked on the adjacent parking lot. The processor 22 also works out a horizontal distance parameter d·count2 by which the user's vehicle 26 runs through the second parking lot 32. The horizontal distance parameter d·count2 and the vertical distance parameter $H_o$ are used to work out the angle and width $C_{x2}$ of the second parking lot 32 according to Equation (2).

Refer to FIG. 4. Suppose that the parking pilot device 10 detects a third parking lot 34 existing between two vehicles 36 and 38 parked on the parking lots adjacent to the parking lot 34. The processor 22 uses the ultrasonic signals echoed from a first parked vehicle 36 to obtain a vertical distance parameter $H_m$ between the user's vehicle 26 and the first parked vehicle 36 and then works out the angle $\theta_1$ of the first parked vehicle 36 on the slanted parking lot. The user's vehicle 26 keeps running forward and obtains vertical distance parameters $H_o$, $H_p$, $H_q$. The processor 22 works out the angle $\theta_2$ of the second parked vehicle 38 on the slanted parking lot from the vertical distance parameter $H_p$. The processor 22 also works out a horizontal distance parameter d·count2 by which the user's vehicle 26 runs through the third parking lot 34. If $\theta_1$ is smaller than $\theta_2$, the processor 22 uses the horizontal distance parameter d·count2 and the vertical distance parameters $H_o$, $H_p$ to work out the angle and width $C_{x3}$ of the third parking lot 34 according to Equation (3). If $\theta_1$ is greater than $\theta_2$, the processor 22 uses the horizontal distance parameter d·count2 and the vertical distance parameters $H_o$, $H_p$, $H_q$ to work out the angle and width $C_{x3}$ of the third parking lot 34 according to Equation (4).

Figure 5A:
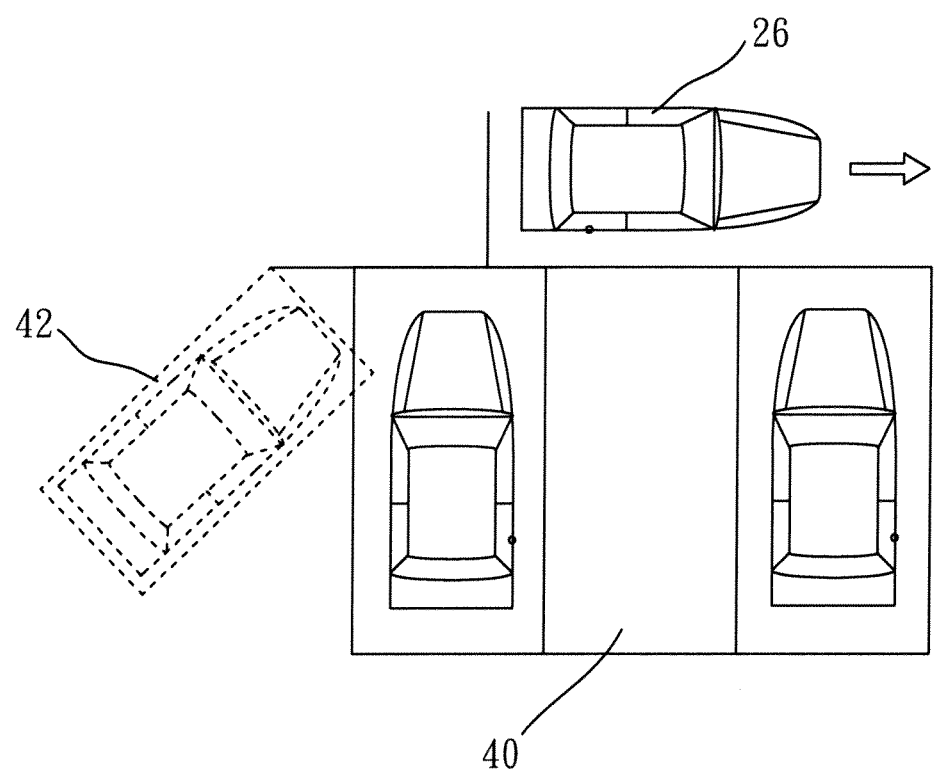
FIGS. 5(a) to 5(c) are diagrams schematically showing that a vehicle is guided to make a preset parking pilot frame coincide with a parking lot according to one embodiment of the present invention.
Figure 5B:
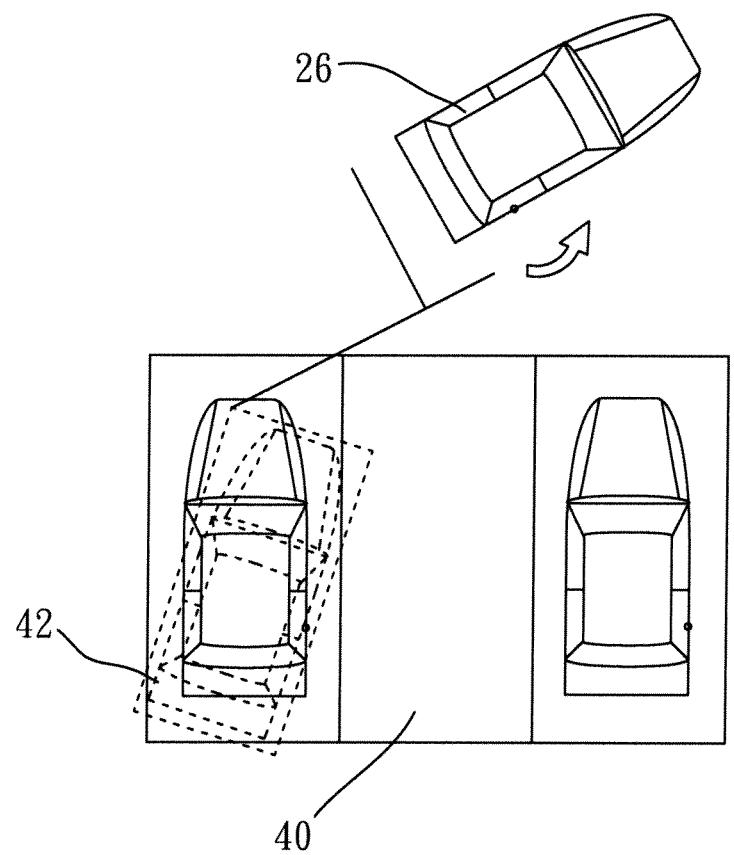
Figure 5C:
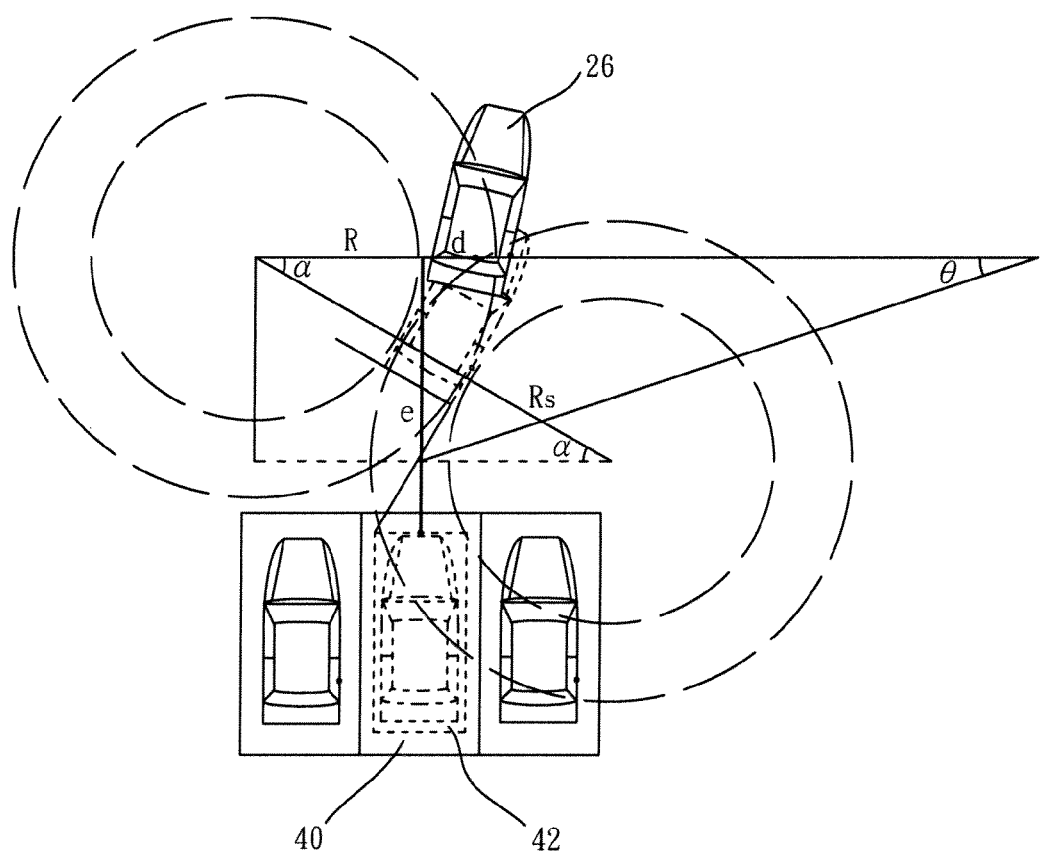

If the parking lot is determined to be suitable to park the user's vehicle 26, a parking lot selection frame is used to designate the parking lot. For example, the user uses the parking lot selection frame to designate the parking lot manually. After designation, the parking lot selection frame will persistently remain on the parking lot shown in the display 12. Then, the process proceeds to Step S16. In Step S16, the processor 22 obtains relative coordinates of the user's vehicle 26 and the parking lot according to the images of the surroundings, the speed of the user's vehicle 26, the distance between the user's vehicle 26 and the parking lot. The processor 22 also uses a parking track planning algorithm to work out a preset parking pilot frame and the relative position of the preset parking pilot frame and the parking lot. The parking lot positioning algorithm can work out the angle and the width of a parking lot, wherefrom the type of a parking lot can be learned. Refer to FIGS. 5(a) to 5(c). In this embodiment, the present invention is exemplified by parking a vehicle into side-by-side parking lots. Parking a vehicle into side-by-side parking lots is similar to backing a vehicle into a garage. The parking track planning algorithm is implemented by Equations (4):

$$e \cdot \tan \theta = d;$$

$$R_s \cos + (R-d) = (R_s + R)\cos \alpha$$

$$(R-d)\tan \alpha + \{R_s + R[(R-d)/\cos \alpha]\} \sin \alpha + R_s \sin \theta / = e;$$

wherein R denotes a first rotation radius of a vehicle, $R_s$ a second rotation radius of the vehicle, $\theta$ the angle contained between the first rotation radius and the second rotation radius, d the vertical distance between the initial position of the vehicle and the center of a parking lot, e the horizontal distance between the initial position of the vehicle and the center of the parking lot, $\alpha$ the angle contained between the initial position and the parking lot.

R and $R_s$ are preset to be the minimum rotation radiuses of the vehicle 26. $\theta$ is predetermined by the relative coordinates of the current position of the user's vehicle 26 and the position of the parking lot 40. Thus is generated a preset parking pilot frame 42. The parking track planning algorithm backward deduces d, e, $\alpha$ and obtains the relative position of the user's vehicle 26 and the parking lot 40, as shown in FIG. 5(a). Next, the process proceeds to Step S18. In Step S18, the parking lot 40 and the preset parking pilot frame 42 are presented on the display 12. The user moves his vehicle 26 to an optimized initial position according to the information presented on the display 12 and makes the parking pilot frame 42 coincide with the parking lot 40, as shown in FIG. 5(b) and FIG. 5(c). In this step, the present invention uses the preset parking pilot frame 42 to help the user drive his vehicle 26 to the optimized initial position, which not only assists the user to fine tune the parking angle but also enables the user to confirm the position of the parking lot. Thus is effectively promoted user's confidence to use the parking pilot device of the present invention. In Step S20, the user may select to operate the steering wheel manually. As the user's vehicle 26 has been at the optimized initial position, the user can park his vehicle 26 into the parking lot 40 fast and accurately. Thereby, the time spent in parking is effectively shortened.

The parking pilot device 10 may further comprise a steering detector 44 installed in the steering wheel of the user's vehicle 26 and connected with the processor 22 to detect the angle variation of the user's vehicle 26 when the user backs his vehicle 26 into a garage. When the user operates the steering wheel to park his vehicle 26, the processor 22 outputs corresponding signals to the display 12 and the speaker 20 in order to feedback the driving status and abnormalities to the user in realtime, according to the angle variation, the images captured by the image detectors 14, the vehicle-to-barrier distance detected by the distance detectors 18. Thus is promoted parking safety.

In addition to the abovementioned manual mode, the user may select an automatic mode to control the steering wheel. In the automatic mode, the processor 22 automatically instructs the steering motor controller 24 to operate the steering wheel to park the user's vehicle 26 into the parking lot 40 according to the signals from the steering wheel. Thus is obtained convenience of parking and achieved the objective of saving time and labor. Especially on a street full of running vehicles, the present invention can fast park a vehicle into a parking lot, preventing from traffic jam and traffic accidents.

In conclusion, the present invention proposes a parking pilot method and a device thereof, which can accurately evaluate whether a parking lot is sufficient to accommodate a vehicle, and which are adaptive to various types of parking lots, such as side-by-side parking lots, head-to-tail parking lots, and slanted parking lots, and which provide optimized parking pilot tracks for various parking modes, such as on-street parking, backing a vehicle into a garage, and slanted parking. Therefore, the present invention can exempt the driver from spending much time on moving his vehicle to and fro to find a suitable parking angle and thus saves the driver much time and labor in parking.

The embodiments described above are only to exemplify the present invention but not to limit the scope of the present invention. Any equivalent variation or modification according to the spirit of the present invention is to be also included within the scope of the present invention.

What is claimed is:

1. A parking pilot method comprising steps:

Step A: capturing images of surroundings of a vehicle, detecting a speed of said vehicle, and detecting a distance from said vehicle to a barrier, to obtain at least one parking lot, an angle and a width of said parking lot;

Step B: evaluating whether said parking lot is suitable for said vehicle by evaluating at least one of the following parking lot positioning algorithms:

$$c_{x1} = (d \cdot \text{count1} + H_m \cdot \tan \theta_1) \cdot \cos \theta_1 \geq W + 2t;$$

$$c_{x2} = (d \cdot \text{count2} - H_o \cdot \tan \theta_1) \cdot \cos \theta_1 \geq W + 2t;$$

$$c_{x3} = (d \cdot \text{count2} - H_o \cdot \tan \theta_1 + H_p \cdot \tan \theta_2) \cdot \left( \frac{\sin(90 - \theta_2)}{\cos(\theta_2 - \theta_1)} + \tan(\theta_2 - \theta_1) \right) - \frac{H_p \cdot \sin(\theta_2 - \theta_1)}{\cos \theta_2} \ldots (\theta_1 < \theta_2);$$

and $$c_{x3} = (d \cdot \text{count2} - H_o \cdot \tan \theta_1 + (H_p - H_q) \tan \theta_2 + H_q \cdot \tan \theta_1) \cdot \cos \theta_1 \ldots (\theta_1 > \theta_2)$$

with $c_{x3} \geq W + 2t$;

wherein $c_{x1}, c_{x2}, c_{x3}$ denote minimum widths required by said vehicle, d is a gear width of a speed detector, count1, count2 are gear numbers that said speed detector detects while said vehicle travels through said parking lot, $H_m$, $H_o$, $H_p$, $H_q$ are distances that a distance detector detects, $\theta_1$, $\theta_2$ are angles of vehicles having been parked on other parking lots, W is a width of said vehicle, and t is a width tolerance for parking said vehicle; if said parking lot is suitable for said vehicle, executing Step C, Step D and Step E; if said parking lot is unsuitable for said vehicle, executing Step A;

Step C: obtaining relative coordinates of a position of said parking lot and a current position of said vehicle according to said images of surroundings of said vehicle, said speed of said vehicle and said distances, and using said relative coordinates to create a preset parking pilot frame and work out a relative position of said preset parking pilot frame and said parking lot;

Step D: designating said parking lot and said preset parking pilot frame on a display within said vehicle, and guiding said vehicle to an initial position in order to make said preset parking pilot frame coincide with said parking lot; and Step E: parking said vehicle into said parking lot.

2. The parking pilot method according to claim 1, wherein in said Step C, a parking track planning algorithm is used to work out said preset parking pilot frame and said relative position of said preset parking pilot frame and said parking lot, and wherein said parking track planning algorithm is implemented by following equations:

$$e \cdot \tan \theta = d;$$

$$R_s \cos \theta + (R-d) = (R_s + R) \cos \alpha; \text{ and}$$

$$(R-d) \tan \alpha + \{R_s + R - [(R-d)/\cos \alpha]\} \sin \alpha + R_s \sin \theta = e;$$

wherein R denotes a first rotation radius of said vehicle, $R_s$ a second rotation radius of said vehicle, $\theta$ an angel contained between said first rotation radius and said second rotation radius, d a vertical distance between said initial position of said vehicle and a center of said parking lot, e a horizontal distance between said initial position of said vehicle and said center of said parking lot, $\alpha$ an angle contained between said initial position and said parking lot, and wherein R and $R_s$ are preset to be minimum rotation radiuses of said vehicle, and $\theta$ is predetermined by said relative coordinates of said current position of said vehicle and said position of said parking lot so as to create said preset parking pilot frame, and wherein said parking track planning algorithm backward deduces d, e, $\alpha$ and obtains said relative position of said vehicle and said parking lot.

3. A parking pilot device, installed in a vehicle and comprising a display installed inside said vehicle to provide information for a driver;

at least one image detector installed on said vehicle to capture images of surroundings of said vehicle;

a speed detector detecting a speed of said vehicle;

at least one distance detector detecting a distance between said vehicle and at least one parking lot and detecting a distance between said vehicle and a barrier;

a processor connected with said display, said image detector, said speed detector and said distance detector; obtaining relative coordinates of a current position of said vehicle and a position of said parking lot and an angle and a width of said parking lot according to said images of surroundings of said vehicle, said speed of said vehicle and said distances; using said relative coordinates and said angle and said width of said parking lot to work out a preset parking pilot frame; designating said parking lot and said preset parking pilot frame on said display; guiding said vehicle to an initial position and make said preset parking pilot frame coincide with said parking lot; and parking said vehicle into said parking lot;

wherein said processor uses a parking lot positioning algorithm to calculate said angle; said width of said parking lot; said speed of said vehicle and said distance between said vehicle and said parking lot to evaluate whether said parking is suitable for said vehicle according to at least one of the following parking lot positioning algorithms:

$$c_{x1} = (d \cdot \text{count1} + H_m \cdot \tan \theta_1) \cdot \cos \theta_1 \geq W + 2t;$$

$$c_{x2} = (d \cdot \text{count2} - H_o \cdot \tan \theta_1) \cdot \cos \theta_1 \geq W + 2t;$$

$$c_{x3} = (d \cdot \text{count2} - H_o \cdot \tan \theta_1 + H_p \cdot \tan \theta_2) \cdot \left( \frac{\sin(90 - \theta_2)}{\cos(\theta_2 - \theta_1)} + \tan(\theta_2 - \theta_1) \right) - \frac{H_p \cdot \sin(\theta_2 - \theta_1)}{\cos \theta_2} \ldots (\theta_1 < \theta_2);$$

and $$c_{x3} = (d \cdot \text{count2} - H_o \cdot \tan \theta_1 + (H_p - H_q) \tan \theta_2 + H_q \cdot \tan \theta_1) \cdot \cos \theta_1 \ldots (\theta_1 > \theta_2)$$

with $c_{x3} \geq W + 2t;$ wherein $c_{x1}$, $c_{x2}$, $c_{x3}$ denote minimum widths required by said vehicle, d is a gear width of said speed detector, count1, count2 are gear numbers that said speed detector detects while said vehicle is traveling, $H_m, H_o, H_p, H_q$ are distances that said distance detector detects, $\theta_1$, $\theta_2$ are angles of vehicles having been parked on other parking lots, W is a width of said vehicle, and t is a width tolerance for parking said vehicle.

4. The parking pilot device according to claim 3, wherein said processor uses a parking track planning algorithm to work out said preset parking pilot frame and a relative position of said preset parking pilot frame and said parking lot, and wherein said parking track planning algorithm is implemented by following equations:

$$e \cdot \tan \theta = d;$$

$$R_s \cos \theta + (R-d) = (R_s + R) \cos \alpha; \text{ and}$$

$$(R-d) \tan \alpha + \{R_s + R - [(R-d)/\cos \alpha]\} \sin \alpha + R_s \sin \theta = e;$$

wherein R denotes a first rotation radius of said vehicle, $R_s$ a second rotation radius of said vehicle, $\theta$ an angel contained between said first rotation radius and said second rotation radius, d a vertical distance between said initial position of said vehicle and a center of said parking lot, e a horizontal distance between said initial position of said vehicle and said center of said parking lot, $\alpha$ an angle contained between said initial position and said parking lot, and wherein R and $R_s$ are preset to be minimum rotation radiuses of said vehicle, and $\theta$ is predetermined by said relative coordinates of said current position of said vehicle and said position of said parking lot so as to create said preset parking pilot frame, and wherein said parking track planning algorithm backward deduces d, e, $\alpha$ and obtains a relative position of said vehicle and said parking lot.

5. The parking pilot device according to claim 3, wherein said processor outputs operation instructions to guide a driver to manually park said vehicle into said parking lot, or automatically controls a steering wheel of said vehicle to park said vehicle into said parking lot.

6. The parking pilot device according to claim 3, wherein said processor provides an on-street parking mode, a mode of backing a vehicle into a garage, and a slanted parking mode, and wherein said processor works out a preset parking pilot frame corresponding to one of said modes beforehand and presents said parking pilot frame on said display.

* * * * *